United States Patent
Dibble et al.

(10) Patent No.: US 10,830,185 B2
(45) Date of Patent: Nov. 10, 2020

(54) RECIRCULATING NOBLE GAS INTERNAL COMBUSTION POWER CYCLE

(71) Applicant: THE REGENTS OF THE UNIVERSITY OF CALIFORNIA, Oakland, CA (US)

(72) Inventors: Robert Woodrow Dibble, Berkeley, CA (US); Miguel Sierra Aznar, Berkeley, CA (US); Timothy Burke Sennott, Berkeley, CA (US); Jyh-Yuan Chen, Berkeley, CA (US)

(73) Assignee: THE REGENTS OF THE UNIVERSITY OF CALIFORNIA, Oakland, CA (US)

( * ) Notice: Subject to any disclaimer, the term of this patent is extended or adjusted under 35 U.S.C. 154(b) by 98 days.

(21) Appl. No.: 15/500,403

(22) PCT Filed: Jul. 31, 2015

(86) PCT No.: PCT/US2015/043324
§ 371 (c)(1),
(2) Date: Jan. 30, 2017

(87) PCT Pub. No.: WO2016/019357
PCT Pub. Date: Feb. 4, 2016

(65) Prior Publication Data
US 2017/0211515 A1    Jul. 27, 2017

Related U.S. Application Data

(60) Provisional application No. 62/032,067, filed on Aug. 1, 2014.

(51) Int. Cl.
*F02M 21/02*    (2006.01)
*F02G 5/02*    (2006.01)
(Continued)

(52) U.S. Cl.
CPC ......... *F02M 21/0206* (2013.01); *F02B 75/02* (2013.01); *F02D 13/02* (2013.01);
(Continued)

(58) Field of Classification Search
CPC ........... F02M 21/0206; F02M 21/0209; F02M 26/35; F02B 75/02; F02D 13/02; F02D 13/0269; F02G 5/02
(Continued)

(56) References Cited

U.S. PATENT DOCUMENTS

| | | | | |
|---|---|---|---|---|
| 8,776,734 | B1 * | 7/2014 | Roy .................. | B01D 5/009 123/1 A |
| 2009/0314005 | A1 * | 12/2009 | Messmer ............ | F02F 1/4292 60/792 |
| 2014/0144397 | A1 * | 5/2014 | Bromberg, III ...... | C01B 3/366 123/3 |

FOREIGN PATENT DOCUMENTS

RU    2052178 C1    1/1996

OTHER PUBLICATIONS

PCT/US2015/043324—International Search Report dated Oct. 29, 2015, 7 pages.
(Continued)

*Primary Examiner* — Lindsay M Low
*Assistant Examiner* — Omar Morales
(74) *Attorney, Agent, or Firm* — Haynes Beffel & Wolfeld LLP; James Hann; Andrew L. Dunlap

(57) ABSTRACT

The present technology provides embodiments of recirculating noble gas combustion power cycles and systems including engines utilizing these power cycles. Embodiments of the cycles may include a combination of a high intake/exhaust pressure, very late or early intake valve closure, late exhaust valve opening, intake preheating using exhaust gases, sensible heat recovery, direct injection of fuel
(Continued)

and/or oxidizer, and a condenser to remove combustion products and dissolved trace contaminant gases. An engine operating on these principles could provide motive force for electrical production, for example at power plants, or for transit, for example for ship engines. An engine operating with the cycles disclosed herein has high thermal efficiency and low cost. For example an argon power cycle using natural gas feedstock and cryogenic oxygen air separation could exceed 60% overall efficiency.

21 Claims, 9 Drawing Sheets

(51) Int. Cl.
*F02M 25/10* (2006.01)
*F02M 26/35* (2016.01)
*F02M 25/00* (2006.01)
*F02D 13/02* (2006.01)
*F02B 75/02* (2006.01)

(52) U.S. Cl.
CPC ........... *F02D 13/0269* (2013.01); *F02G 5/02* (2013.01); *F02M 21/0209* (2013.01); *F02M 25/00* (2013.01); *F02M 25/10* (2013.01); *F02M 26/35* (2016.02); *F02B 2075/027* (2013.01); *Y02T 10/12* (2013.01); *Y02T 10/30* (2013.01)

(58) Field of Classification Search
USPC ......................................................... 123/311
See application file for complete search history.

(56) References Cited

OTHER PUBLICATIONS

PCT/US2015/043324—International Preliminary Report on Patentability dated Feb. 16, 2017, 7 pages.

* cited by examiner

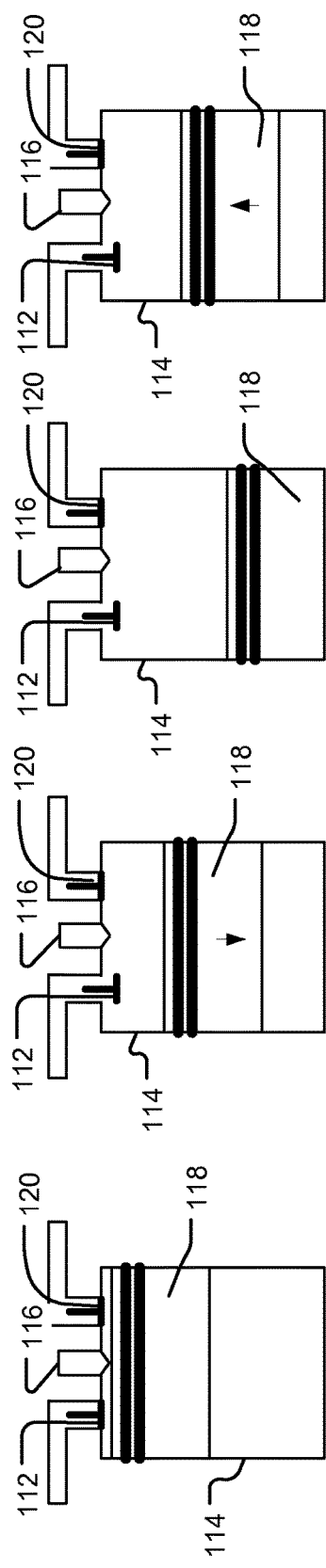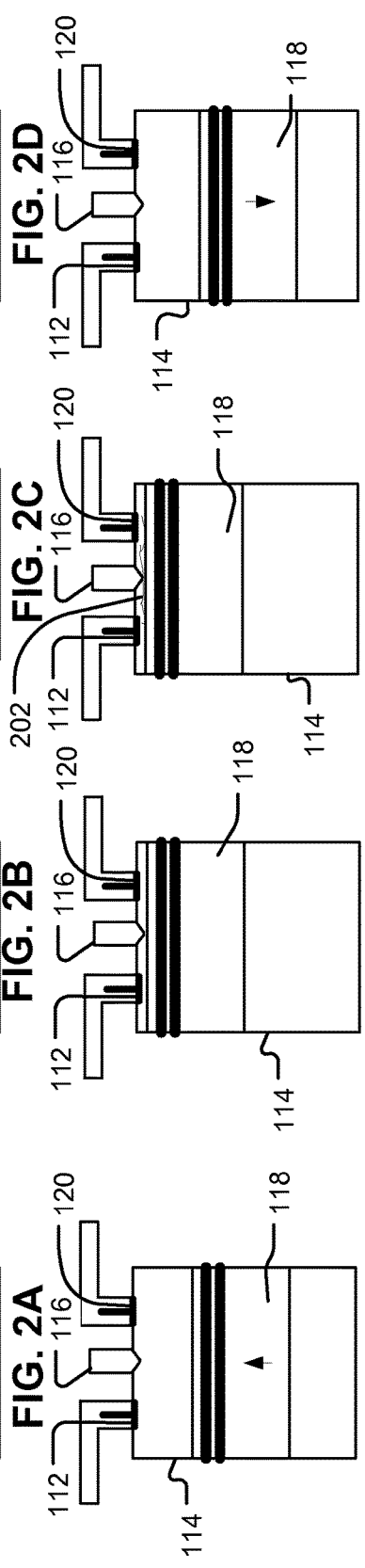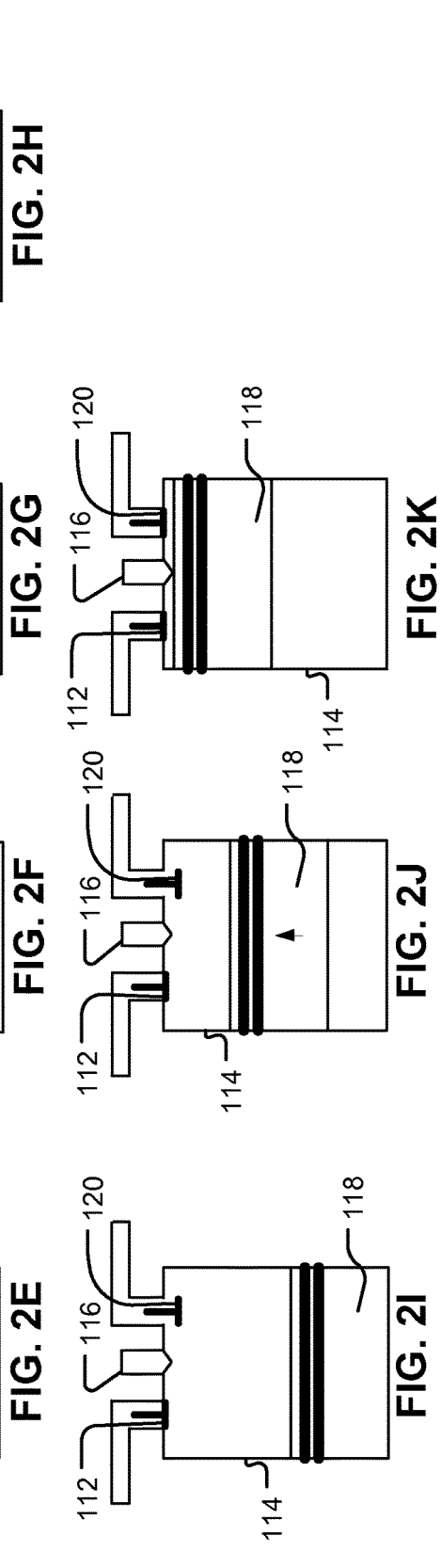

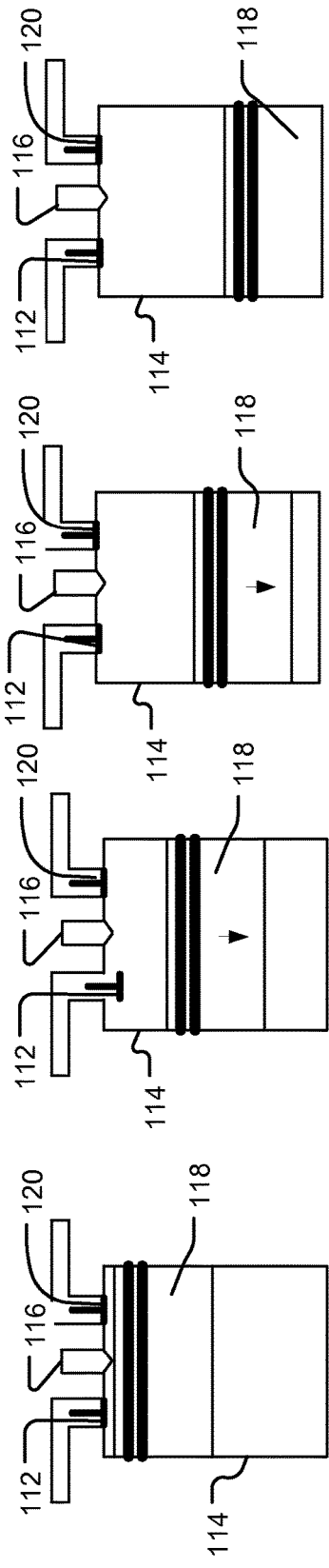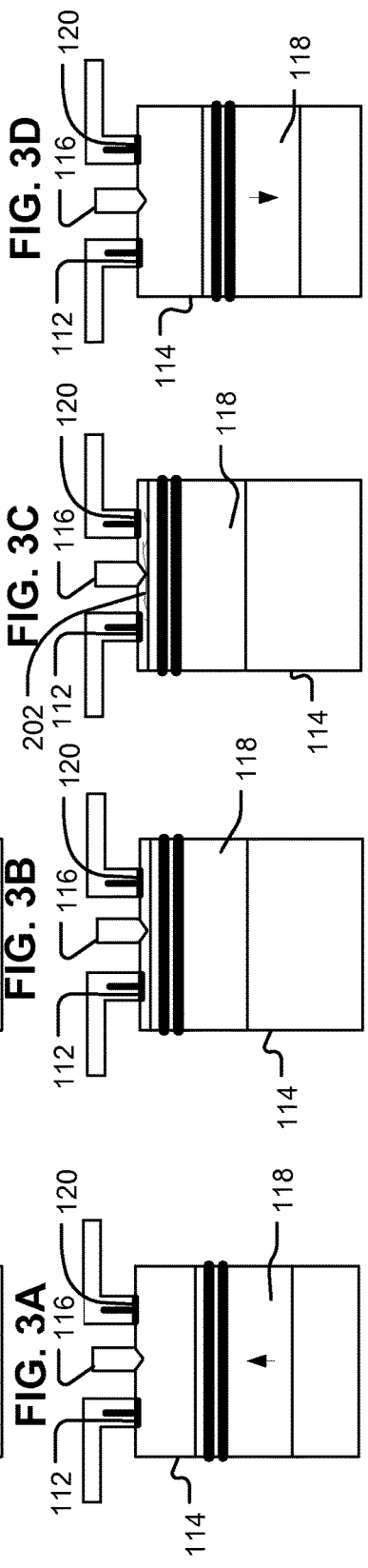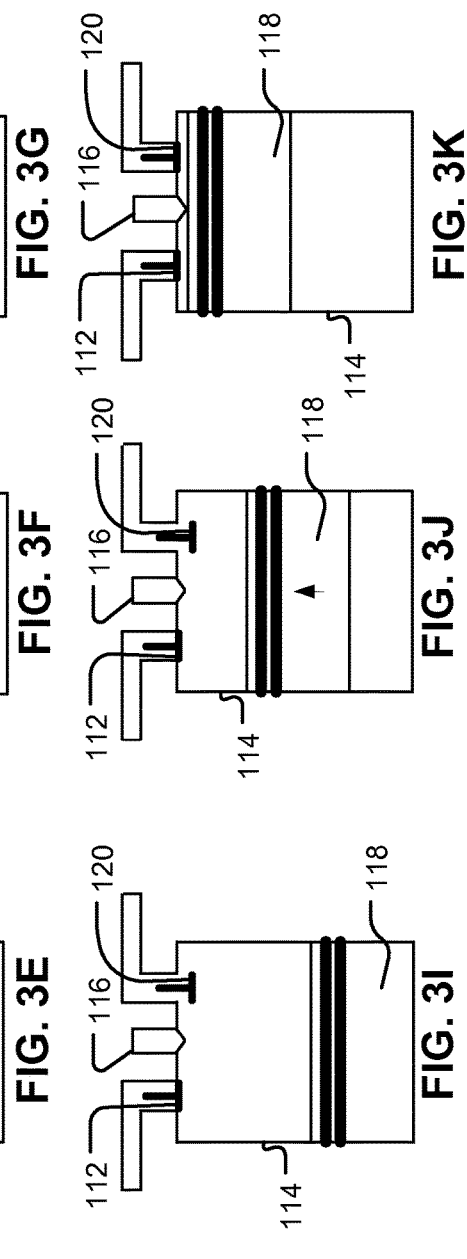

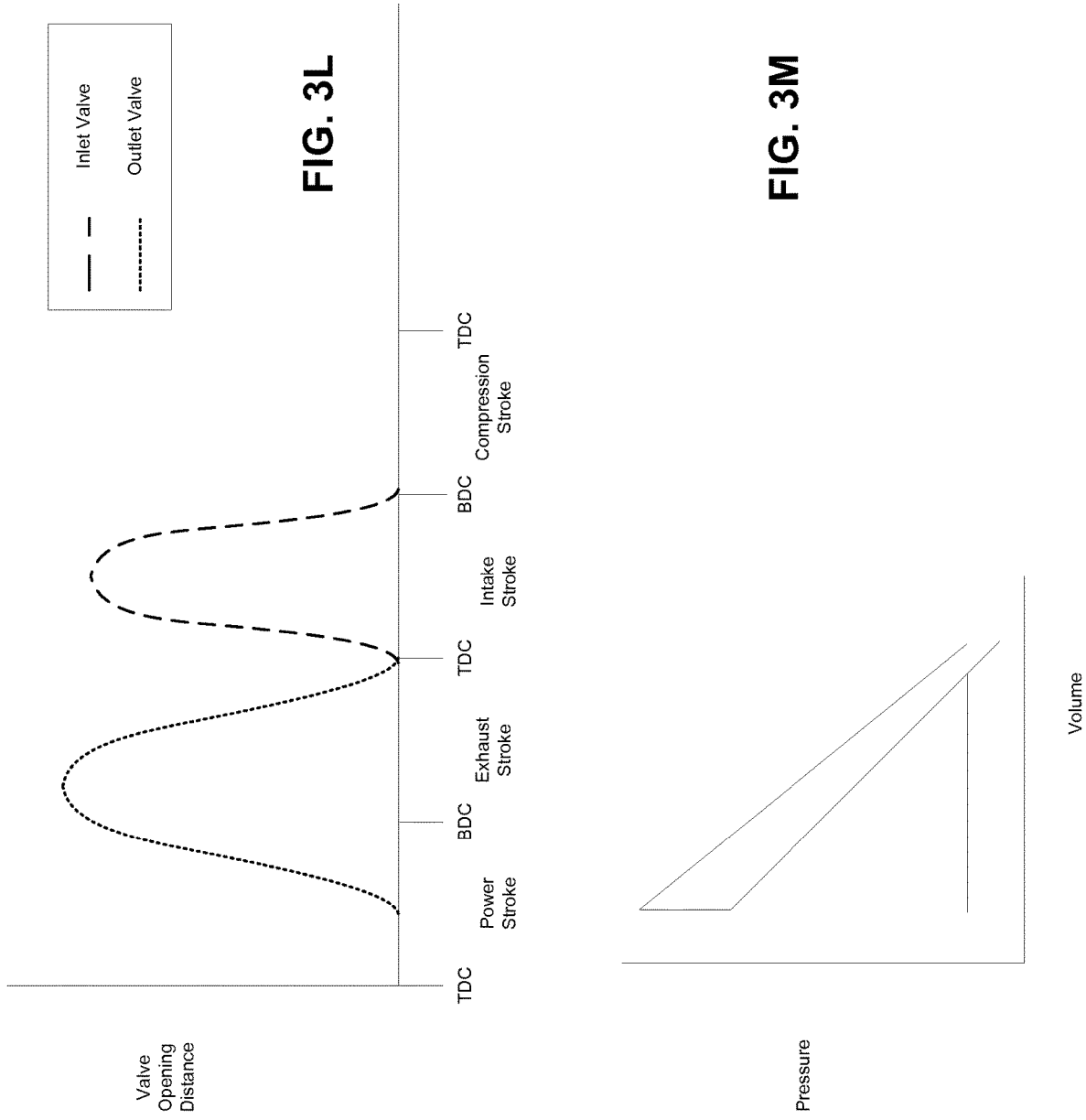

RECIRCULATING NOBLE GAS INTERNAL COMBUSTION POWER CYCLE

TECHNICAL FIELD

This disclosure relates to combustion cycles for recirculating noble gas combustion power cycles and to systems including engines operating with the disclosed combustion cycles.

BACKGROUND

Power conversion cycles turning fuel into heat and heat into power are limited by basic thermodynamic considerations that have an effect on the efficiency of these conversion cycles. For example, gas turbines approach efficiencies of 35%, large bore internal combustion engines reach efficiencies of 50%, fuel cells reach efficiencies of 55%, and combined power plants, for example a combination of a Brayton cycle and a Rankine bottoming cycle that benefits from the waste heat of a gas turbine, approach efficiencies of 60%.

The efficiency of the gas power cycles used in for example turbines and engines is limited by the specific heat ratio of the working fluid. For economic and practical reasons, combustion cycles generally use ambient air to provide both the oxidizer and working fluid. Power cycles have been developed that uses a monoatomic gas in place of air as the working fluid. The power cycles can have a greater thermal efficiency than similar cycles using air because the specific heat ratio of air, 1.4, is less than the specific heat ratios of monoatomic gases, for example the specific heat ratio of Argon is 1.66. Based on the specific heat ratios, the use of a monoatomic gas may increase cycle efficiency by a factor of 1.3-1.4 compared to similar cycles using air. Further, engines running on cycles with a monoatomic gas working fluid may reuse exhausted working fluid by recirculating it back to the inlet of the engine.

Using hydrogen to generate power is being explored in applications including gas turbines, internal combustion engines, and fuel cells. Hydrogen combustion in gas turbines produces nitric oxide emissions, and is limited in efficiency and temperature by the material strength of the turbines to that of current power plants. Fuel cells have the disadvantage of being very expensive. Internal combustion engines running cycles including recirculating monoatomic gas working fluids have been made to utilize hydrogen, hydrocarbons, or oxigenates as a fuel and oxygen as an oxidizer. In the case of hydrogen as a fuel and oxygen as an oxidizer the resulting byproduct is water. This water may be removed easily from the recirculating working fluid. These recirculating monoatomic gas cycles have previously not been seriously considered because burning in air is inexpensive and convenient.

Methods of storing energy prior to using the energy is a growing field, particularly relating to efficiently utilizing the stored energy. Methods for electrical energy storage are various and include batteries, pumped hydro, flywheels, hydrogen energy storage, and compressed air energy storage. One area of energy storage that is being developed is 'load-leveling' energy storage that can shift power over hours or days. Technologies for load leveling energy storage include batteries, hydrogen energy storage, and compressed air energy storage. Batteries have high round-trip efficiencies but are cost-prohibitive for load-leveling energy storage. Compressed air energy storage has poor efficiency and poor energy density.

It is therefore desirable to provide technology for using stored energy that is inexpensive, has high energy density, is efficient, and is environmentally friendly. It is further desirable to provide methods to efficiently utilize carbonaceous fuels and produce pure carbon dioxide which may be utilized or sequestered. As such, it is desirable to provide technology for a high-efficiency combustion power cycle that is well adapted to carbon capture with low energy cost.

SUMMARY

The present technology provides embodiments of recirculating noble gas combustion power cycles and systems including engines utilizing these power cycles. Embodiments of the cycles may include a combination of a high intake/exhaust pressure, very late or early intake valve closure, late exhaust valve opening, intake preheating using exhaust gases, sensible heat recovery, direct injection of fuel and/or oxidizer, a condenser to remove combustion products and dissolved trace contaminant gases, and a carbon dioxide separation unit if carbonaceous fuels are to be used. An engine operating on these principles could provide motive force for electrical production, for example at power plants, or for transit, for example for ship engines. An engine operating with the cycles disclosed herein has high thermal efficiency and low cost. For example an argon power cycle using natural gas fuel and cryogenic oxygen air separation could reach 60% overall efficiency.

The cycles disclosed herein can be incorporated into new engine designs. Further, existing engines may be reconfigured to operate with the technology disclosed herein. In embodiments, engines operating with the disclosed recirculating noble gas combustion power cycles include features which allow the engine to also run open-looped using ambient air and direct-injected fuel (e.g. natural gas) as an alternative to the closed loop monoatomic gas recirculating, pure hydrogen and pure oxygen burning operation mode.

Embodiments of the recirculating noble gas combustion power cycles disclosed may include high-quality exhaust heat that energy is extracted from. For example, high-quality exhaust heat is supplied to a steam reforming process, or to a Rankine-type or similar "bottoming" cycle. In embodiments, the quality of the exhaust heat can be increased by preheating of the intake fluid by heat exchange, through use of a heat exchanger, with exhaust fluid.

Embodiments of the technology may include various injection methods including direct injection of both fuel and oxygen, e.g. for energy storage application, or oxygen or fuel alone, e.g. for applications where fuel and/or oxygen are not stored at high pressure.

Embodiments of the technology may include various valve timing schemes. The valve timing schemes may reduce the effective volume ratio of compression stroke, and the peak pressure and temperature can be limited. Due to the high specific heat ratio of the argon working fluid, embodiments may include very late intake valve closure in the valve timing scheme. This large ratio of expansion stroke to compression stroke affords higher thermal efficiencies and limits peak pressure and temperature within the engine.

Late intake valve closure may result in power loss which in embodiment may be offset by increasing the cycle pressure, i.e. 'boosting', to increase the charge density and regain this power loss. The increased cycle pressure is above the ambient pressure. Boosting also assists in reducing recirculating water content. Boosting the cycle working pressure by large amounts, for example 3-4 bar, has the additional effect of reducing the absolute humidity of the condenser exit stream. This reduces or eliminates the need for additional exhaust drying to prevent substantial efficiency penalty from the recirculating water and its effect on working fluid specific heat ratio. Further, high cycle working pressure allows for membrane or adsorbent separation with low parasitic energy cost for power cycles using carbonaceous fuels and having carbon dioxide as a combustion byproduct.

Applications for embodiments of the technology include enhanced hydrogen energy storage systems for load-leveling applications in the electrical grid. Embodiments of the disclosed cycle technology are a lower cost and more efficient means of converting stored hydrogen and oxygen back into electricity. Hydrogen energy storage systems including the technology disclosed herein have a higher energy density than compressed air energy storage, and much lower per kWh capital costs than batteries. In addition, because recirculating noble gas combustion power cycles utilize internal combustion engines, the technology has good grid electrical characteristics, including good load-following and frequency regulation. Further, in embodiments, hydrogen energy storage systems including recirculating noble gas combustion power cycles could be configured to generate electricity conventionally with carbonaceous fuels, for example, methane burning in air, when grid conditions did not make storage economically viable.

Further applications for embodiments of the noble gas combustion power cycles include medium-scale utility power generation units using hydrogen as a fuel, or alternatively direct use of carbonaceous fuels. The hydrogen fuel may be generated from steam reforming methane or coal gasification in a pre-combustion carbon capture context. High-efficiency plants of this type have excellent load-response characteristics compared to existing combined cycle plant technology, making them integrate better with increasing portfolios of variable generation. Further applications for embodiments of the technology include electrical production collocated with, and using, hydrogen byproduct from methane steam reforming employed to produce CO2 for enhanced oil recovery operations or carbon capture and sequestration schemes. Direct use of carbonaceous fuels in the power cycle, including both gaseous (e.g. natural gas) and liquid (e.g. methanol, dimethyl ether), coupled with appropriate carbon capture technology (e.g. membrane separation, pressure swing adsorption), allows for high-efficiency utilization of these fuels while producing pure CO2 for enhanced oil recovery or other carbon sequestration schemes.

Other aspects and advantages of the present technology can be seen on review of the drawings, the detailed description and the claims, which follow.

BRIEF DESCRIPTION OF THE DRAWINGS

FIG. 2A, FIG. 2B, FIG. 2C, FIG. 2D, FIG. 2E, FIG. 2F, FIG. 2G, FIG. 2H, FIG. 2I, FIG. 2J, FIG. 2K, FIG. 2L, and FIG. 2M illustrate various aspects of a power cycle including very late intake valve closure with a high quality of exhaust heat.

FIG. 3A, FIG. 3B, FIG. 3C, FIG. 3D, FIG. 3E, FIG. 3F, FIG. 3G, FIG. 3H, FIG. 3I, FIG. 3J, FIG. 3K, FIG. 3L, and FIG. 3M illustrate various aspects of a power cycle including very early intake valve closure with a high quality of exhaust heat.

DETAILED DESCRIPTION

Figure 1A:
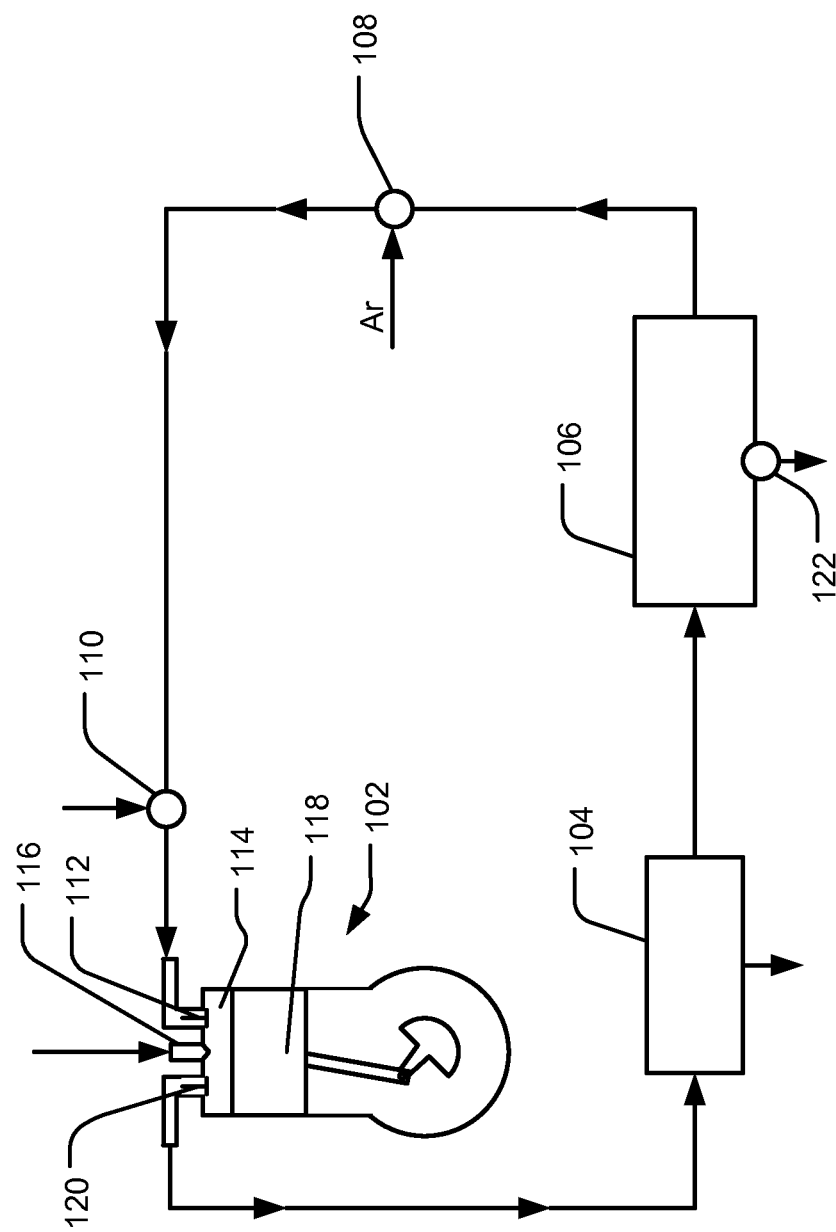
FIG. 1A shows a simplified block of an embodiment of recirculating engine.

The following description will typically be with reference to specific structural embodiments and methods. It is to be understood that there is no intention to be limited to the specifically disclosed embodiments and methods but that other features, elements, methods and embodiments may be used for implementations of this disclosure. Preferred embodiments are described to illustrate the technology disclosed, not to limit its scope, which is defined by the claims. Those of ordinary skill in the art will recognize a variety of equivalent variations on the description that follows. Unless otherwise stated, in this application specified relationships, such as parallel to, aligned with, or in the same plane as, mean that the specified relationships are within limitations of manufacturing processes and within manufacturing variations. When components are described as being coupled, connected, being in contact or contacting one another, they need not be physically directly touching one another unless specifically described as such. Like elements in various embodiments are commonly referred to with like reference numerals. A detailed description of embodiments of the present technology is provided with reference to the Figures.

FIG. 1A is an illustration of a system including a recirculating power cycle. The system includes a piston engine 102 in a substantially closed loop. Also within the closed loop are a sensible heat recovery element 104, and a condenser 106. Flowing around the closed loop is a working fluid. In the example recirculating power cycle systems shown, the working fluid comprises Argon. However, in embodiments the working fluid comprises one or more monoatomic gas including Helium, Neon, Krypton, and Xenon. Monoatomic gases only store energy on a translation mode of motion, and therefore thermodynamically they are identical. However, monoatomic gases do have different heat transfer characteristics, and therefore in embodiments the monoatomic gases for the working fluid may be selected based on a desired heat transfer characteristic of the working fluid. From a cost and practicality standpoint, Argon is preferable for many applications as it is abundant in the atmosphere, and may be isolated during a process of separating oxygen, to use in combustion in the engine, from ambient air.

Small portions of the monoatomic gas of the working fluid may leave the closed-loop system through various processes or leaks in the system. Therefore the system includes a low volume working fluid input port 108. The input port 108 may be positioned anywhere in the closed loop. In embodiments, the working fluid may continually be introduced through the input port into the closed loop at a rate corresponding to the rate of working fluid lost from the closed loop. In embodiments, the working fluid may be intermediately introduced through the input port into the closed loop at predetermined time increments or based on sensed concentration of working fluid in the closed loop.

In embodiments, the piston engine 102 is configured to run on hydrogen as a fuel and oxygen as an oxidizer. In the embodiment shown in FIG. 1, oxygen is introduced to the closed loop at an oxygen premixing port 110 located near the intake valve 112 of the piston engine 102. Further, in the embodiment shown in FIG. 1, hydrogen is directly injected into the cylinder 114 of the piston engine 102 through a direct injection nozzle 116. The Oxygen and Hydrogen are stored separately in high or low pressure storage units (not shown). As will be discussed below, the hydrogen may be injected during the end of the compression stroke of the piston 118 within the cylinder 114 and the pressure and temperature of the working fluid will reach an ideal injection temperature which will cause spontaneous auto-ignition of the hydrogen and oxygen to occur as the hydrogen is injected.

In embodiments, the piston engine 102 includes a crank case purge (not shown). In these embodiments, the crankcase is sealed and ventilated with the Argon working fluid. The crank case purge is configured to allow any argon and combustion gases that escape through the piston ring pack to be re-introduced into the intake, which reduce losses.

In embodiments, as an alternative to premixing of oxygen, the oxygen may be directly injected, into the cylinder 114 of the piston engine 102 through one or more direct injection nozzles 116. Advantages of direct Oxygen injection include a smaller volumetric flow rate needed for a stoichiometric reaction, and therefore less compression work. Further oxygen has a higher density and therefore direct injection provides greater jet momentum.

In embodiments, to ensure combustion of the desired amount of fuel and oxidizer an excess of one may be provided. In embodiments, excess oxygen may be introduced into the closed loop which will ensure complete combustion of the hydrogen and the oxygen will recirculate to be burned during subsequent cycles. However, it is advantageous not to provide too much excess of either fuel or oxidizer as this will dilute the concentration of working fluid which will lower the specific heat of the fluid within the system which has adverse effects on the thermal efficiency of the system.

After combustion, the exhaust gases leave the piston engine 102 through the exhaust valve 120 and passes through the sensible heat recovery element 104. Heat is extract from the exhaust gas in the sensible heat recovery element 104 which may be used as a heat supply for a steam reforming process of converting natural gas into hydrogen, or for other purposes such as a bottoming cycle. For example, the sensible heat recovery element 104 may include an air to liquid heat exchange that can be used to preheat a natural gas stream or to generate the steam necessary for the reforming process. The hydrogen created during the reforming process may be stored and later used as the fuel injected into the piston engine. The exhaust stream will run at temperatures that strongly depend on the valve timing and level of dilution of the working fluid, as will be discussed later in this application.

In the embodiment illustrated in FIG. 1, the exhaust is cooled down to saturation temperatures at the given pressure as it exits the sensible heat recovery element 104 and enters the condenser 106. The condenser 106 is configured to remove byproducts of combustion and dissolved trace contaminant gases, for example $CO_2$ and NOx, from the exhaust of the piston engine 102. In the embodiments including a monoatomic gas working fluid, hydrogen fuel, and oxygen oxidizer, the byproducts of combustion include water which condensates within the condenser 106. Water and other contaminants, including trace contaminant gases and heavy particles precipitated in the water, leave the closed loop through an exit port 122 of the condenser 106. The fluid leaving the condenser toward the intake valve 112 of the piston engine 102 is mainly composed of the working fluid, in the example Argon, though small amounts of water and minor traces of gases may also remain.

Figure 1B:
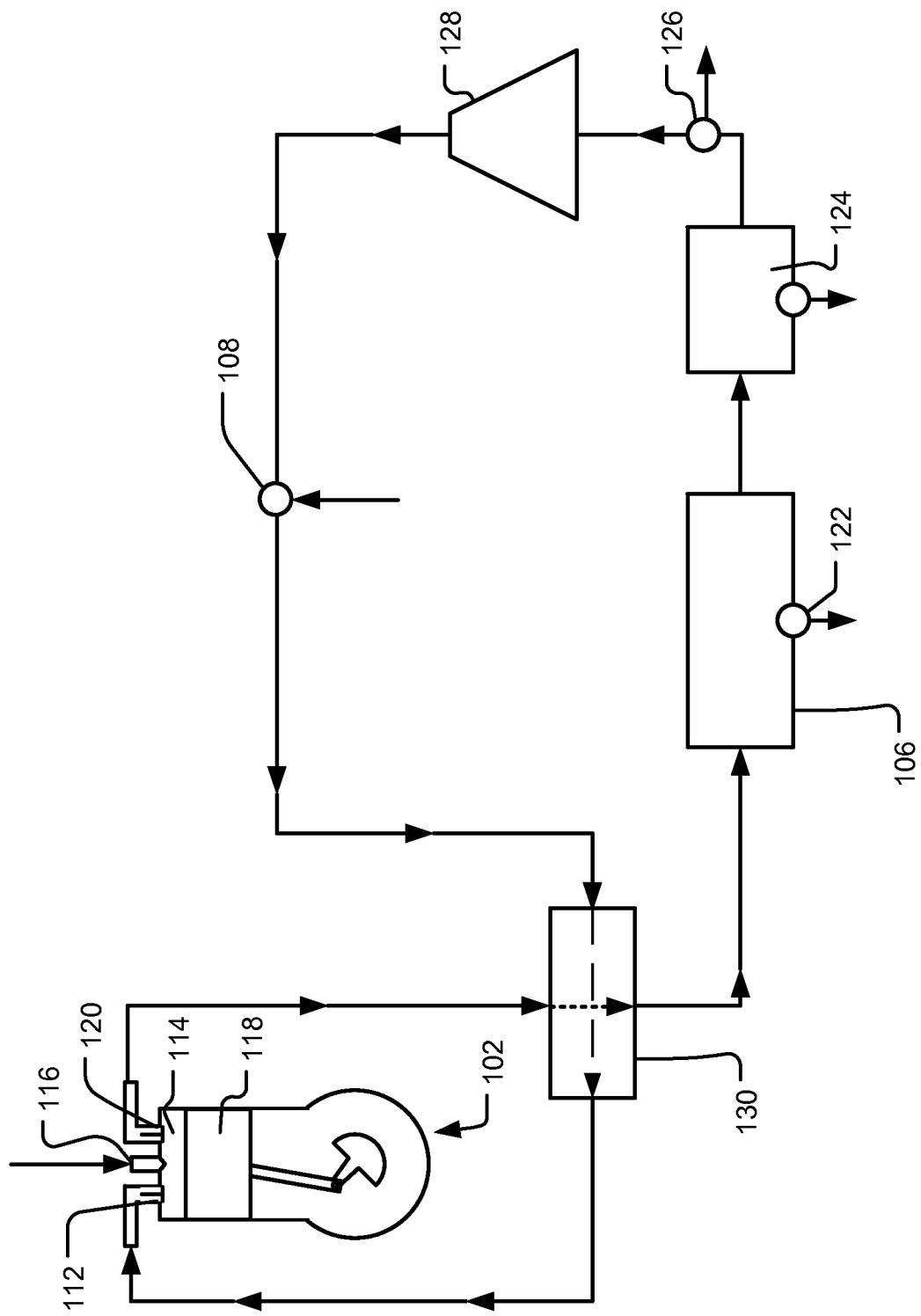
FIG. 1B shows a simplified block of an embodiment of recirculating engine including intake preheating and boosting.

FIG. 1B is an illustration of a system including a recirculating power cycle similar to the system of FIG. 1A and including additional features. Similar to FIG. 1A, the system illustrated in FIG. 1B includes a substantially closed loop including a piston engine 102 with an intake valve 112, an exhaust valve 120, a cylinder 114, and a direct injection nozzle 116. In the embodiment shown in FIG. 1B, both hydrogen and oxygen may be directly injected into the cylinder 114 through one or more direct injections nozzles 116. The loop also includes a condenser 106 and a low volume working fluid input port 108, as discussed above.

The closed loop further includes a trace gas removal element 124, located after the condenser 106 in the closed loop. Trace gases may build up during operation, and may be attributed to impurities in reactant streams and combustion of lubricating oils. However, in embodiments, non-combustible lubricating oils, for example, silicone oils, are used to prevent buildup of CO2 in hydrogen based cycles. The trace gas removal element 124 is configured to remove trace gases in the fluid leaving the condenser 106. The trace gas removal element 124 may include processes including catalysts, urea treatment, adsorbents, and absorbents.

To remove contaminants not removed by the condenser 106 or trace gas removal element 124, the closed loop further includes a low value purge valve 126. The low value purge valve 126 may be configured to continuously allow removal of fluid from within the closed-loop. For example, the low value purge valve 126 may be configured to allow gases to leave the system at a rate of up 1% of the total volume of gas in the closed loop per cycle of the piston engine 102. As discussed above, the working fluid that leaves the closed loop system, such as through the low value purge valve 126, may be replaced through the low volume working fluid input port 108.

In the systems described herein, the term "closed-loop", also referred to as "substantially closed-loop", is used to describe a system in which exhaust gases expelled from an engine are not exhausted into the ambient. In a "closed-loop" system the exhaust gases are processed to separate working fluid of the system from combustion byproducts and contaminants. The working fluid is then recirculated into the engine intake. As previously disclosed, in a closed loop system a portion of the working fluid may be lost from the system due to leaks and as part of the combustion byproduct and contaminant removal processes. Despite these losses a system is still considered to be "substantially closed-loop" because the exhaust gases are no expelled into the ambient and a substantially portion, >90%, of exhausted working fluid is returned to the intake of the engine in subsequent cycles.

In the systems illustrated in FIGS. 1A and 1B, the piston engine may maintain, or increase, pressure within the closed loop. Increasing pressure within the closed loop is referred to as "boosting". The embodiment illustrated in FIG. 1B includes a compressor 128 in the closed loop, between the low value purge valve 126 and the low volume working fluid input port 108, which is configured to boost the pressure in the closed loop. The boost created by the compressor, or the piston engine, may make up for pressure losses caused by recirculation through the closed-loop of ducts. Further, the boost of a compressor may make up for pressure losses in embodiments wherein the piston engine is a two-stroke cycle engine as opposed to a four-stroke cycle engine.

After the intake gas passes through the compressor 128 the intake gas passes through a heat exchanger 130 to be warmed by the exhaust gas from the piston engine 102. The heat exchanger 130 includes a first chamber fluidly coupling the exhaust valve 120 of the piston engine 102 to the condenser 106, and a second chamber fluidly coupling the intake gas from the condenser 106 and compressor 128 to the intake valve 112 of the piston engine 102. The heat exchanger is configured to preheat working fluid entering the piston engine with heat extracted from working fluid exiting the piston engine. In embodiments, the heat exchanger may be of the flat plate, shell or tube type. Additionally, the heat exchanger may comprise an adiabatic wheel, or include direct contact in the case of heat recovery to a liquid. Rapid auto ignition of the injected reactants is important to limit premixing and reduce rapid pressure rise from premixed combustion, and thus the ideal injection temperature is likely to be higher than that afforded by the ideal compression volume ratio. Preheating the intake gases using the exhaust gases affords decoupling these cycle parameters, and also accomplishes some of the exhaust cooling required before the condenser step. Though auto ignition is desired, it is important to have control over when the auto ignition occurs and how the auto ignition influences the combustion event. The level of premixing before auto ignition temperatures are reached is an important parameter to adjust combustion phasing. A large amount of premixed mixture before ignition may shift backwards the combustion phasing which will lower the thermodynamic efficiency and potentially cause the breakdown of the piston engine due to extreme pressure rise rates. By adjusting the intake temperature, another control parameter is added for auto ignition to be advanced/delayed. Varying the intake temperature influences the amount of premixed mixture that the auto ignition event will include and consequently the pressure rise rate. In addition, intake preheating increases the exhaust temperature, 'quality', which is advantageous if the exhaust is to be utilized, for example combined with steam reforming facilities or used in a bottoming cycle.

Figure 1C:
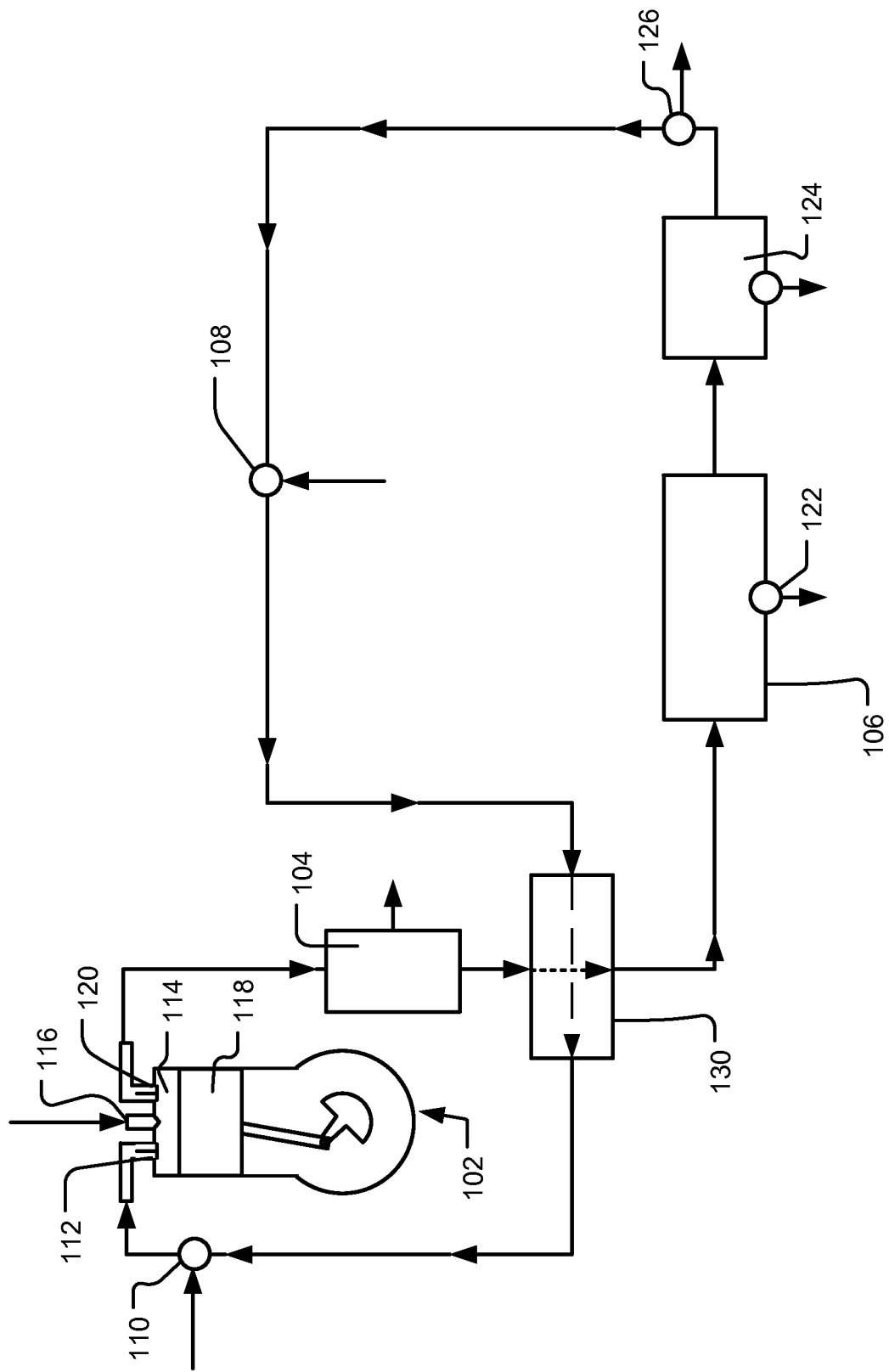
FIG. 1C shows a simplified block of an embodiment of recirculating engine including intake preheating.

FIG. 1C is an illustration of a system including a recirculating power cycle similar to the system of FIG. 1B. Similar to FIG. 1B, the system illustrated in FIG. 1C includes a substantially closed loop including a piston engine 102 with an intake valve 112, an exhaust valve 120, a cylinder 114, and a direct injection nozzle 116. In the embodiment shown in FIG. 1C, oxygen may be premixed through oxygen premixing port 110. The closed-loop also includes a condenser 106, a sensible heat recovery element 104, a low volume working fluid input port 108, a trace gas removal element 124, a low volume purge valve 126, and a heat exchanger 130, as discussed above.

Figure 1D:
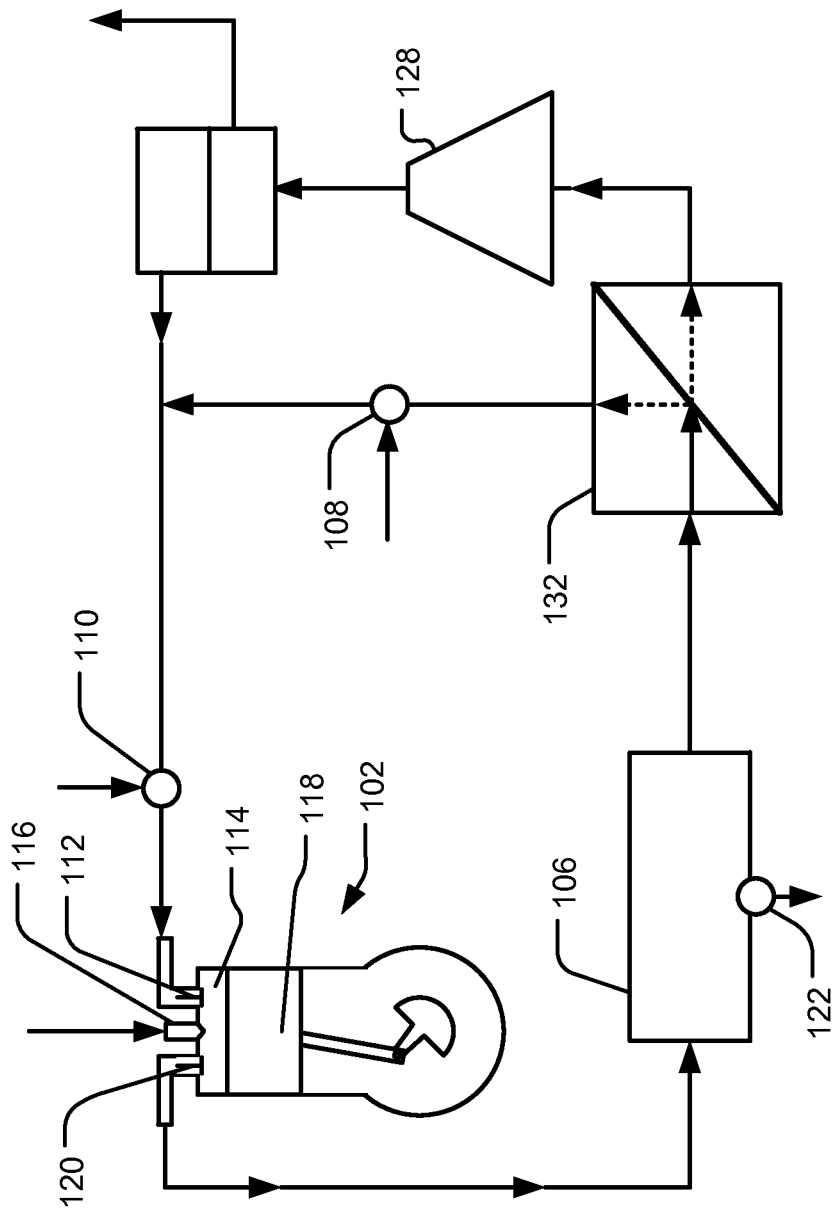
FIG. 1D shows a simplified block of an embodiment of recirculating engine including a $CO_2$ separation membrane.

FIG. 1D is an illustration of a system including a recirculating power cycle, similar to discussed above, using direct use of carbonaceous fuels and post-combustion separation technology. Similar to FIG. 1A, the system illustrated in FIG. 1D includes a substantially closed loop including a piston engine 102 with an intake valve 112, an exhaust valve 120, a cylinder 114, and a direct injection nozzle 116. In the embodiment shown in FIG. 1D, oxygen may be premixed by through oxygen premixing port 110. The closed-loop also includes a condenser 106, and a low volume working fluid input port 108, as discussed above.

In system in FIG. 1D, a carbonaceous fuel is directly injected into the cylinder 114 through the direct injection nozzle 116. Combustion of the carbonaceous fuel, along with oxygen premixed with the working fluid at oxygen premixing port 110, occurs in the piston engine 102 and the resulting combustion byproducts include water and carbon dioxide, $CO_2$. The water is removed from the exhaust gases in the condenser 106, as is discussed above in other embodiments.

The system in FIG. 1D further includes a $CO_2$ separation membrane unit 132 configured to remove the $CO_2$ resulting from the combustion of the carbonaceous fuel. Fluids leaving the condenser 106 enter the $CO_2$ separation membrane unit 132 and the $CO_2$ is separated from the fluid and enters a compressor 128. The working fluid continues from the $CO_2$ separation membrane unit 132 back toward the intake valve 112 of the piston engine 102, similar to the systems shown in FIG. 1A. In embodiments, $CO_2$ separation technologies may be utilized, including a combination of one or more of membrane separation, cryogenic separation, amine absorption, and pressure swing adsorption.

The $CO_2$ leaves the compressor and enters a cryogenic separation device 134. The Argon produced in the cryogenic separation device enters the closed-loop system as is shown. The $CO_2$ leaves the cryogenic separation device and may be used in applications such as enhanced oil recovery.

The power cycles disclosed above may include various ratios of fuel, oxidizer, and workings fluid. Example 1: (0.5-2 part) O2 to 1 part H2 to (2-20 parts) Ar. Example 2: (2-8 parts) O2 to 1 part CH4 to (8-80 parts) Ar. Example 3: (3-12 parts) O2 to 1 part CH3OCH3 to (12-120 parts) Ar. Example 4: (1.5-6 parts) O2 to 1 part CH3OH to (8-80 parts) Ar. Further, systems as disclosed may include features allowing for dual use as a closed-loop recirculating power cycle system and an open-loop ambient air breathing power cycle system. This system is advantageous when hydrogen, oxygen or a monoatomic gas working fluid are not readily available.

FIGS. 1A, 1B, 1C and 1D, illustrate example combinations of features in recirculating power cycles, however other combinations of the components illustrated and discussed herein are envisioned within the scope of the technology disclosed herein. Further, while a piston engine with a single cylinder and single piston has been shown, the technology may be used with multiple cylinder and piston engines. Further, each piston may include one or more intake and exhaust valves.

The recirculating power cycles of the piston engines disclosed herein include valve timing schemes which are designed for the closed loop recirculating nature of the systems and high overall efficiency in mind. A key aspect of the valve time scheme is the intake valve closure. The intake valve closure determines the pressure ratio and thus the highest temperature of the working fluid. Intake valve closure time can be used to reduce the compression ratio of the compression stroke, while the expansion stroke ratio remains fixed, which helps control the load and the ignition timing.

In embodiments of the recirculating power cycles the intake valve closure is configured to reduce a compression ratio between 4:1 and 25:1; and reduce the amount of charge in the cylinder. To reduce the charge in the cylinder the intake valve is closed very early or very late relative to the intake valve closing times in an Otto cycle.

Figure 2L:
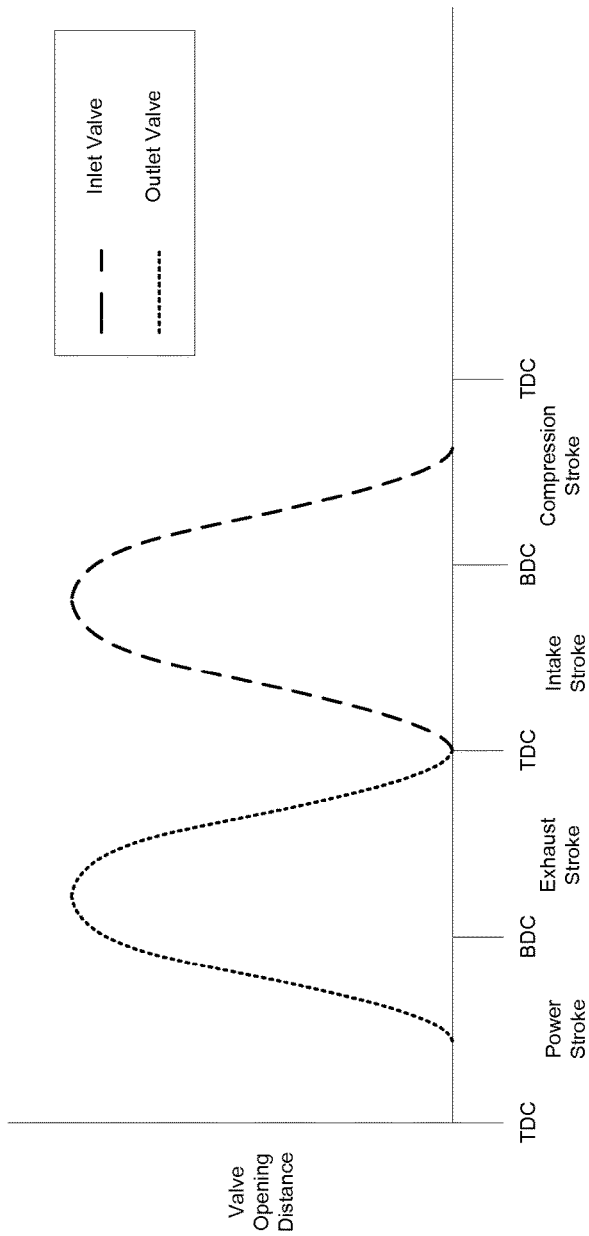

FIGS. 2A-M illustrate various aspects of a power cycle including very late intake valve closure with a high quality of exhaust heat. FIG. 2A illustrates the beginning of an intake stroke of a power cycle including very late intake valve closure. In FIG. 2A the piston 118 is at top dead center and both the intake and exhaust valves 112 and 120 are closed. FIG. 2B illustrates an intermediate position in the intake stroke where the piston 118 is located between end positions and the piston 118 is traveling toward bottom dead center and the intake valve 112 is open. FIG. 2C illustrates the end of the intake stroke with the piston 118 at bottom dead center and the intake valve 112 is open and the exhaust valve 120 is closed. FIG. 2D illustrates an intermediate position in the compression stroke where the piston 118 is located between bottom dead center and top dead center and the intake valve 112 remains open. The intake valve 112 remaining open during the beginning of the compression strokes cause gases inside of the cylinder 114 to be expelled through the open intake valve. FIG. 2E illustrates another stage in the compression stroke, after the stage illustrated in FIG. 2D, wherein the piston 118 is located between bottom dead center and top dead center. The piston 118 is travelling toward top dead center and the intake valve 112 is now closed. The closure of the intake valve 112 during the compression stroke occurs for example between 0 and 120 degrees past bottom dead center. This late closure of the intake valve and is referred to as very late intake valve closure. The very late intake valve closure results in reduced effective volume ratio of the compression stroke and a large ratio of expansion stroke to compression stroke. The very late intake valve closure occurs prior to a fuel injection angle where fuel is injected into the cylinder and auto ignition occurs. Reason being, if auto ignition occurs while the intake valve is open damage to the valve train may occur.

FIG. 2F illustrates the end of the compression stroke with the piston 118 located at top dead center. In the embodiment illustrated, at this point the fuel 202 is directly injected into the cylinder 117 and combustion occurs initiating the power stroke, as illustrated in FIG. 2F. In embodiments, fuel is injected during the compression stroke, for example up to 20-40 degrees before top dead center. The timing of the fuel injection helps control combustion phasing and control power level. The expanding gases caused by combustion push the piston toward bottom dead center as shown in FIG. 2H. At the end of the power stroke the piston is located at bottom dead center as shown in FIG. 2I. Once at bottom dead center the exhaust valve 120 may be opened as shown in FIG. 2I. With the exhaust valve 120 open the piston travels toward top dead center during the exhaust stroke forcing gases to exit the cylinder 114 through the open exhaust valve 120 as shown in FIG. 2J. The exhaust stroke ends with the piston 118 located at top dead center and the exhaust valve 120 closed as shown in FIG. 2J. After the exhaust stroke is complete the intake stroke begins and the cycle as shown in FIGS. 2A-2K repeats.

In embodiments the exhaust valve opening and closing timing may be different than shown in FIGS. 2A-2K. For example, power cycles may include late exhaust valve opening wherein the exhaust valve does not open until the initiation of the exhaust stroke which is much later than in an Otto cycle wherein the exhaust valve opens during the power stroke. In embodiments the exhaust valve opens for example between −10 degrees and 20 degrees after bottom dead center of the beginning of the exhaust stroke.

Figure 2M:
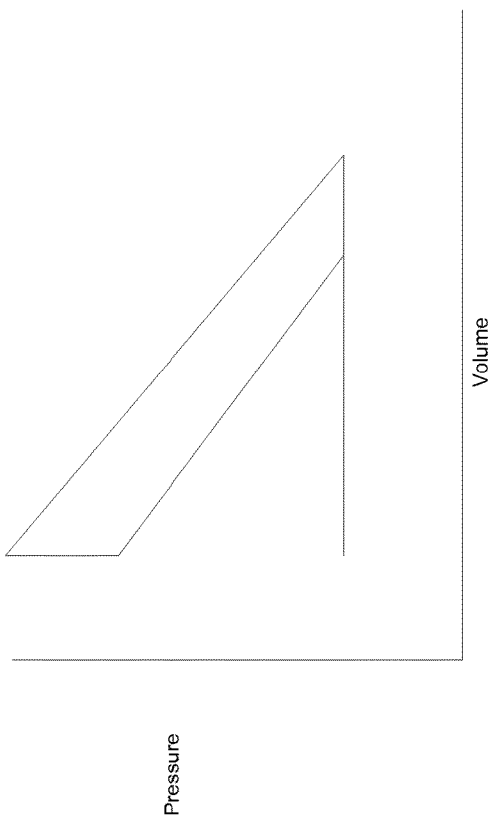

FIG. 2L illustrates an embodiment valve timings and relative opening distance of the intake and exhaust valve in a power cycle including later intake valve closure. FIG. 2M illustrates an embodiment the pressure and volume of the in a piston engine with a power cycle including late intake valve closure.

FIGS. 3A-M illustrate various aspects of a power cycle including very early intake valve closure with a high quality of exhaust heat. FIG. 3A illustrates the beginning of an intake stroke of a power cycle including very late intake valve closure. In FIG. 3A the piston 118 is at top dead center and both the intake and exhaust valves 112 and 120 are closed. FIG. 3B illustrate an intermediate position in the intake stroke where the piston 118 is located between end positions and the piston 118 is traveling toward bottom dead center and the intake valve 112 is open. FIG. 3C illustrates a second intermediate position in the intake stroke, after the position illustrated in FIG. 3B. In FIG. 3C the piston is still traveling toward bottom dead center and the intake valve 112 is now closed. FIG. 3D illustrates a position at the end of the intake stroke and beginning of the compression stroke wherein the piston 118 is at bottom dead center and the intake valve 112 and the exhaust valve 120 are closed. The intake valve 112 closing before the end of the intake stroke cause less than the full volume of the stroke to pulled in through the intake valve during the intake stroke. The closure of the intake valve 112 during the intake stroke occurs between 120 and 0 degrees before bottom dead center. This early closure of the intake valve and is referred to as very early intake valve closure. The very early intake valve closure results in reduced effective volume ratio of the compression stroke and a large ratio of expansion stroke to compression stroke.

FIG. 3E illustrates a stage in the compression stroke, wherein the piston 118 is located between bottom dead center and top dead center, and the piston 118 is travelling toward top dead center.

FIG. 3F illustrates the end of the compression stroke with the piston 118 located at top dead center. At this point the fuel 202 is directly injected into the cylinder 117 and combustion occurs initiating the power stroke, as illustrated in FIG. 3F. The expanding gases caused by combustion push the piston toward bottom dead center as shown in FIG. 3H. At the end of the power stroke the piston is located at bottom dead center as shown in FIG. 3I. Once at bottom dead center the exhaust valve 120 may be opened as shown in FIG. 3I. With the exhaust valve 120 open the piston travels toward top dead center during the exhaust stroke forcing gases to exit the cylinder 114 through the open exhaust valve 120 as shown in FIG. 3J. The exhaust stroke ends with the piston 118 located at top dead center and the exhaust valve 120 closed as shown in FIG. 3J. In embodiments the exhaust valve opening and closing timing may be different than shown in FIGS. 3A-3K. For example, power cycles may include late exhaust valve opening as discussed above, such that exhaust valve closure may overlap with inlet valve opening. After the exhaust stroke is complete the intake stroke begins and the cycle as shown in FIGS. 3A-3K repeats.

FIG. 3L illustrates an embodiment valve times and relative opening distance of the intake and exhaust valve in a power cycle including early intake valve closure. FIG. 3M illustrates an embodiment the pressure and volume of the in a piston engine with a power cycle including early intake valve closure.

Figure 4:
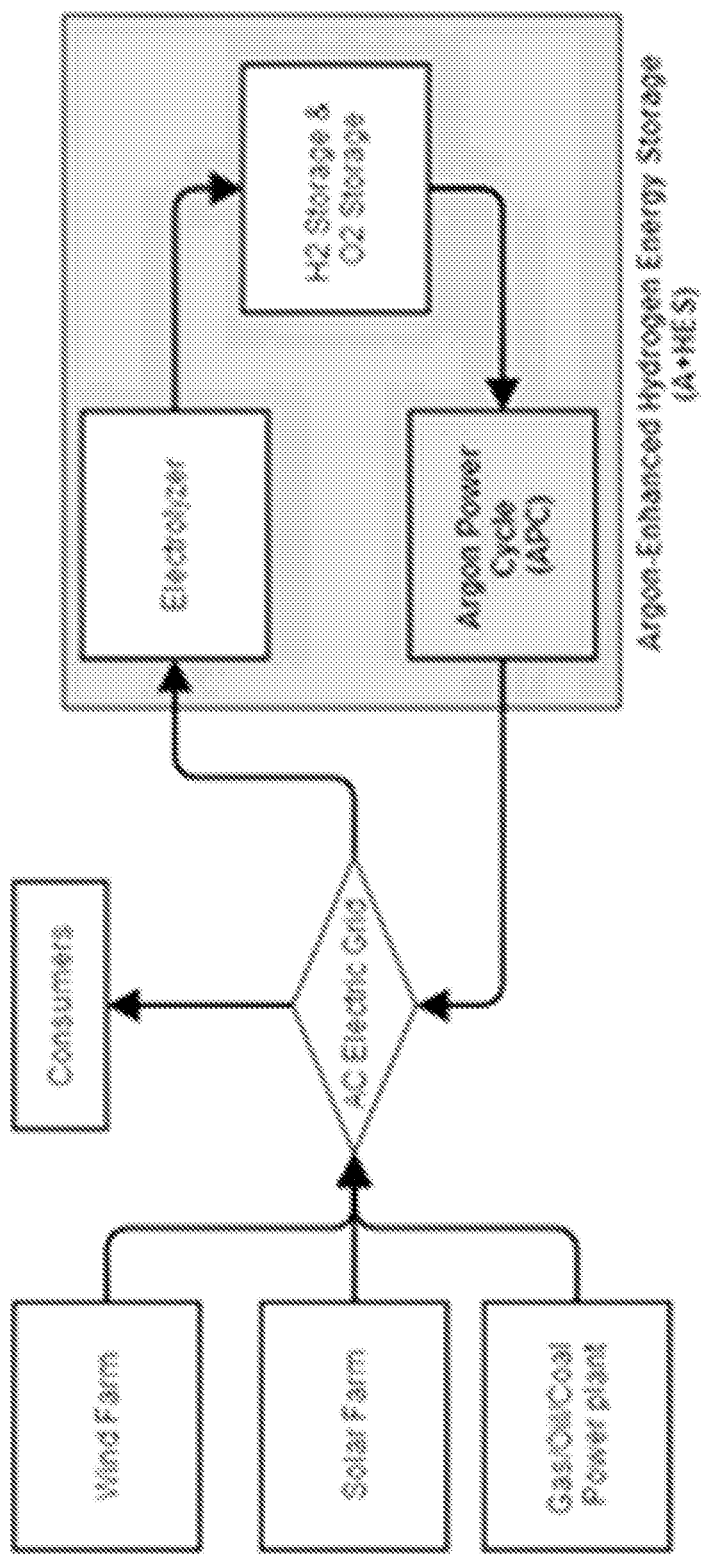
FIG. 4 shows a schematic of an argon power cycle in a hydrogen energy storage system.

FIG. 4 shows a schematic of an argon power cycle in a hydrogen energy storage system. As shown, various energy sources including wind farms, solar farms, and gas/oil/coal power plants provide energy to the AC electric grid. The consumer demand is addressed with the energy in the grid and excess energy may go to an electrolyzer to create hydrogen and oxygen which may be stored. When consumer demand on the grid exceeds the output of the primary energy sources the stored hydrogen and oxygen may be used in the Argon Powers cycle, which utilizes the technology disclosed herein, to efficiently convert the stored hydrogen and oxygen into energy usable by the consumers.

While the present technology is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the technology and the scope of the following claims.

What is claimed is:

1. A recirculating energy system comprising:
a piston engine comprising:
a cylinder;
an intake valve at a first end of the cylinder;
an exhaust valve at the first end of the cylinder; and
a piston located within the cylinder and configured to be able to reciprocate between a top dead center position proximate to the first end of the cylinder and a bottom dead center position towards a second end of the cylinder,
wherein the piston engine is configured to include a valve timing scheme to reduce a compression ratio,
wherein the recirculating energy system is configured so that a substantially closed loop path, through which a working fluid is flowable, is formed from:
the exhaust valve outputting exhaust gas,
to a sensible heat recovery device configured to allow heat to be extracted from the output exhaust gas;
to a condenser configured to receive cooled gas from the sensible heat recovery device and to condense the received cooled gas into the working fluid so as to remove combustion byproducts introduced into the substantially closed loop path,
to the intake valve configured to receive the working fluid output from the condenser and oxygen that is directly injected in an amount to allow for a stoichiometric reaction during combustion,
to the cylinder configured to facilitate combustion of the working fluid, and
back to the exhaust valve outputting the exhaust gas,
wherein the recirculating energy system further comprises a heat exchanger including (i) a first chamber fluidly coupling the exhaust valve and an intake of the condenser and (ii) a second chamber fluidly coupling an exhaust of the condenser and the intake valve, and
wherein the heat exchanger is configured to preheat the working fluid exiting the condenser and received by the intake value using heat extracted from the output exhaust gas exiting the exhaust valve.

2. The recirculating energy system of claim 1, further comprising a carbon dioxide separation element fluidly coupled within the substantially closed loop path and configured to separate carbon dioxide, from combustion of carbonaceous fuels, from the working fluid.

3. The recirculating energy system of claim 1,
wherein the piston engine is configured to be able to operate as a four stroke cycle internal combustion engine including an intake stroke, a compression stroke, a power stroke and an exhaust stroke,
wherein the intake valve opens during the intake stroke between 200 degrees and 170 degrees before bottom dead center, and
wherein the intake valve closes during the compression stroke between 0 degrees and 120 degrees past bottom dead center.

4. The recirculating energy system of claim 1,
wherein the piston engine is configured to be able to operate as a four stroke cycle internal combustion engine including an intake stroke, a compression stroke, a power stroke and an exhaust stroke,
wherein the intake valve opens during the intake stroke between 200 degrees and 170 degrees before bottom dead center, and
wherein the intake valve closes during the intake stroke between 120 degrees and 0 degrees before bottom dead center.

5. The recirculating energy system of claim 1,
wherein the piston engine is configured to be able to operate as a four stroke cycle internal combustion engine including an intake stroke, a compression stroke, a power stroke and an exhaust stroke,
wherein the exhaust valve opens during the exhaust stroke between 10 degrees before bottom dead center and 20 degrees after bottom dead center, and
wherein the exhaust valve closes during the intake stroke between 10 degrees before top dead center and 20 degrees after top dead center.

6. The recirculating energy system of claim 1, wherein the piston engine is configured to include a valve timing scheme to reduce the compression ratio between 4:1 and 25:1.

7. The recirculating energy system of claim 1, further comprising one or more valves configurable to open the substantially closed loop path to ambient air,
wherein the piston engine is configured to be able to use oxygen in the ambient air as an oxidizer and be able to exhaust into the ambient air.

8. The recirculating energy system of claim 1, wherein the piston engine is configured to run with argon as the working fluid, pure hydrogen as a fuel, and pure oxygen as an oxidizer.

9. The recirculating energy system of claim 1 wherein the piston engine is configured to run with argon as the working fluid, a hydrocarbon or oxygenate as a fuel, and pure oxygen as an oxidizer.

10. The recirculating energy system of claim 1, wherein the condenser (i) removes combustion byproducts introduced into the substantially closed loop path by condensing at least part of the working fluid into water that includes trace contaminant gases and particles precipitated therein and (ii) allows the remaining working fluid to flow to the intake valve.

11. The recirculating energy system of claim 1, wherein greater than 90% of the working fluid exhausted from the exhaust valve as exhaust gas is returned to the intake valve to facilitate the combustion.

12. The recirculating energy system of claim 1, further comprising a compressor located downstream from the condenser and disposed between the condenser and the intake valve, wherein the compressor increases pressure within the substantially closed loop path.

13. A method of operating a recirculating energy system comprising:
in a piston engine comprising:
a cylinder;
an intake valve at a first end of the cylinder;
an exhaust valve at the first end of the cylinder, and
a piston located within the cylinder and configured to be able to reciprocate between a top dead center position proximate to the first end of the cylinder and a bottom dead center position towards a second end of the cylinder, wherein the method comprises:
operating the piston engine to include a valve timing scheme to reduce a compression ratio; and
operating the recirculating energy system as a substantially closed loop path, through which a working fluid is flowable, the closed loop path being formed from:
the exhaust valve outputting exhaust gas,
to a sensible heat recovery device configured to allow heat to be extracted from the output exhaust gas,
to a condenser configured to receive cooled gas from the sensible heat recovery device and to condense the received cooled gas into the working fluid so as to remove combustion byproducts introduced into the closed loop path,
to the intake valve configured to receive the working fluid output from the condenser and oxygen that is directly injected in an amount to allow for a stoichiometric reaction during combustion,
to the cylinder configured to facilitate combustion of the working fluid, and
back to the exhaust valve outputting the exhaust gas,
wherein the recirculating energy system further comprises a heat exchanger including (i) a first chamber fluidly coupling the exhaust valve and an intake of the condenser and (ii) a second chamber fluidly coupling an exhaust of the condenser and the intake valve, and
wherein the method further comprises operating the heat exchanger preheat the working fluid exiting the condenser and received by the intake value using heat extracted from the output exhaust gas exiting the exhaust valve.

14. The method of claim 13,
wherein the recirculating energy system further comprises a carbon dioxide separation element fluidly coupled within the closed loop path, and
wherein the operating of the recirculating energy system further comprises separating carbon dioxide, from combustion of carbonaceous fuels, from the working fluid.

15. The method of claim 13, further comprising:
operating the piston engine as a four stroke cycle internal combustion engine including an intake stroke, a compression stroke, a power stroke and an exhaust stroke;
opening the intake valve during the intake stroke between 200 degrees and 170 degrees before bottom dead center; and
closing the intake valve during the compression stroke between 0 degrees and 120 degrees past bottom dead center.

16. The method of claim 13, further comprising:
operating the piston engine as a four stroke cycle internal combustion engine including an intake stroke, a compression stroke, a power stroke and an exhaust stroke;
opening intake valve during the intake stroke between 200 degrees and 170 degrees before bottom dead center; and
closing the intake valve during the intake stroke between 120 degrees and 0 degrees before bottom dead center.

17. The method of claim 13, further comprising:
operating the piston engine as a four stroke cycle internal combustion engine including an intake stroke, a compression stroke, a power stroke and an exhaust stroke;
opening the exhaust valve during the exhaust stroke between 10 degrees before bottom dead center and 20 degrees after bottom dead center; and
closing the exhaust valve during the intake stroke between 10 degrees before top dead center and 20 degrees after top dead center.

18. The method of claim 13, further comprising operating the piston engine to include a valve timing scheme to reduce the compression ratio between 4:1 and 25:1.

19. The method of claim 13,
wherein the recirculating energy system further comprises one or more valves,
wherein the operating of the recirculating energy system further comprises opening the substantially closed loop path to ambient air, and
wherein the method further comprises operating the piston engine to use oxygen in the ambient air as an oxidizer and to exhaust into the ambient air.

20. The method of claim 13, further comprising operating the piston engine to run with argon as the working fluid, pure hydrogen as a fuel, and pure oxygen as an oxidizer.

21. The method of claim 13, further comprising operating the piston engine to run with argon as the working fluid, a hydrocarbon or oxygenate as a fuel, and pure oxygen as an oxidizer.

* * * * *